US011417157B2

(12) United States Patent
Macneille et al.

(10) Patent No.: US 11,417,157 B2
(45) Date of Patent: Aug. 16, 2022

(54) STORING VEHICLE DATA

(71) Applicant: Ford Global Technologies, LLC, Dearborn, MI (US)

(72) Inventors: Perry Robinson Macneille, Lathrup Village, MI (US); Kwaku O. Prakah-Asante, Commerce Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 487 days.

(21) Appl. No.: 16/424,730

(22) Filed: May 29, 2019

(65) Prior Publication Data
US 2020/0380801 A1 Dec. 3, 2020

(51) Int. Cl.
*G07C 5/08* (2006.01)
*H04L 9/32* (2006.01)
*G07C 9/00* (2020.01)

(52) U.S. Cl.
CPC ......... *G07C 5/085* (2013.01); *G07C 9/00309* (2013.01); *H04L 9/3236* (2013.01); *G07C 2209/63* (2013.01); *H04L 2209/38* (2013.01)

(58) Field of Classification Search
CPC G07C 5/085; G07C 9/00309; G07C 2209/63; G07C 2009/00769; G07C 5/008; G07C 5/0841; H04L 9/3236; H04L 2209/38; H04L 9/3271; H04L 2209/84; H04L 9/3239; H04L 67/12; H04L 67/1097
USPC .......................... 340/988, 5.74, 9.1; 701/1, 2
See application file for complete search history.

(56) References Cited

U.S. PATENT DOCUMENTS

| 7,117,075 | B1 | 10/2006 | Larschan et al. |
| 8,725,135 | B2* | 5/2014 | Weyl ................. G06F 8/65 455/420 |
| 9,635,518 | B2 | 4/2017 | Lee et al. |
| 9,881,272 | B2 | 1/2018 | Mitchell et al. |
| 10,447,483 | B1* | 10/2019 | Su ...................... G06F 8/65 |
| 10,719,501 | B1* | 7/2020 | Leise .................. G06Q 40/12 |
| 10,726,000 | B1* | 7/2020 | Fortney ............. G06F 16/2308 |
| 10,812,257 | B2* | 10/2020 | Kong ................... H04W 4/48 |
| 2009/0119657 | A1* | 5/2009 | Link, II ................ G06F 8/65 717/171 |
| 2016/0107646 | A1 | 4/2016 | Kolisetty et al. |
| 2017/0024938 | A1 | 1/2017 | Lindsay |
| 2018/0342036 | A1* | 11/2018 | Zachary ............. H04L 9/0637 |
| 2019/0031145 | A1* | 1/2019 | Trelin ................ B60R 16/037 |
| 2019/0139047 | A1* | 5/2019 | Ronnow ............. H04L 9/3236 |
| 2019/0184916 | A1* | 6/2019 | Troia ................... H04W 4/44 |
| 2019/0313224 | A1* | 10/2019 | Yu ....................... H04L 67/12 |
| 2020/0026864 | A1* | 1/2020 | Meier ................. H04W 4/40 |

(Continued)

OTHER PUBLICATIONS

Katia Pagle, "Driver-Vehicle-Environment Monitoring Modules", AIDE Final Workshop and Exhibition, Apr. 15-16, 2008, Gothenburg, Sweden (14 pages).

*Primary Examiner* — Nam V Nguyen
(74) *Attorney, Agent, or Firm* — Brandon Hicks; Bejin Bieneman PLC

(57) ABSTRACT

A computer includes a processor. The processor is programmed to generate, upon detecting a vehicle entry device, a first data block including a hash of identification data for the entry device. The processor is further programmed, upon detecting a trip event, to generate a second data block including a hash of trip event data and a hash linking the second data block to the first data block.

20 Claims, 9 Drawing Sheets

(56) References Cited

U.S. PATENT DOCUMENTS

| | | | |
|---|---|---|---|
| 2020/0126321 A1* | 4/2020 | Swearingen | G06Q 10/063 |
| 2020/0175788 A1* | 6/2020 | Park | G07C 5/008 |
| 2020/0177398 A1* | 6/2020 | Takemori | H04L 9/3268 |
| 2020/0184404 A1* | 6/2020 | Mezaael | G06F 16/27 |

* cited by examiner

STORING VEHICLE DATA

BACKGROUND

Vehicles receive a variety of user data including user control inputs, data from video cameras, data from biometric sensors, etc. Digital data collected and/or stored in vehicles can be lost or corrupted, for example in a collision, and can also be vulnerable to alteration.

DETAILED DESCRIPTION

Introduction

Figure 1:
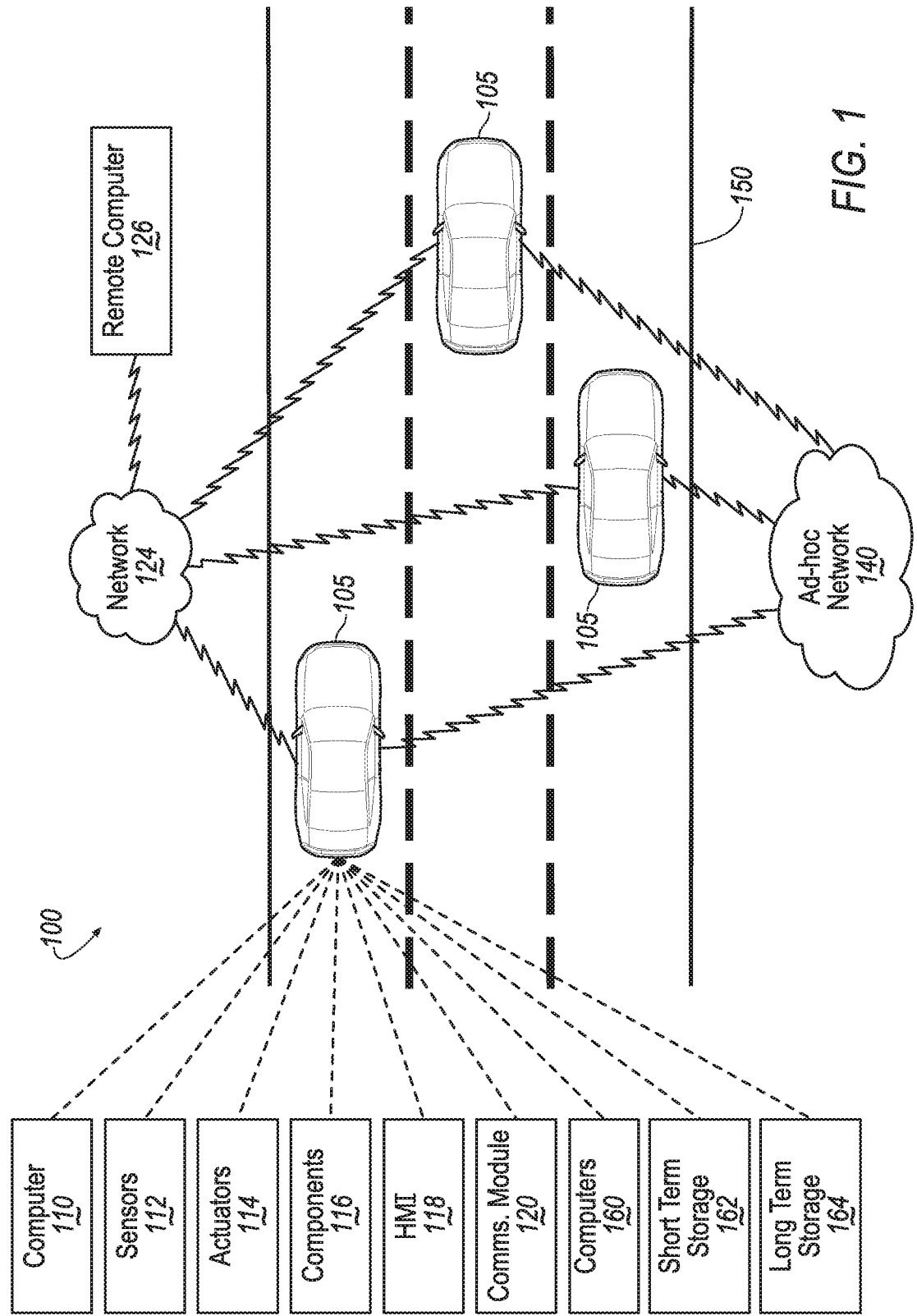
FIG. 1 is a diagram illustrating an example system for distributed storage of vehicle data.

Disclosed is a system comprising a computer including a processor, and a memory. The memory stores instructions such that the processor is programmed to: generate, upon detecting a vehicle entry device, a first data block including a hash of identification data for the entry device; and generate, upon detecting a trip event, a second data block including a hash of trip event data and a hash linking the second data block to the first data block.

The hash linking the second data block to the first data block can be a hash of data in the first data block.

The processor can be further programmed to include a hash of a vehicle identification number for a first vehicle in the first data block, wherein the first vehicle includes the computer.

The processor can be further programmed to include a hash of data indicating at least one of a time of detecting the entry device, data indicating a date of detecting the entry device and data indicating a location of detecting the entry device.

The processor can be further programmed to include a hash of (1) the hash of identification data for the entry device; (2) the hash of the vehicle identification number for the first vehicle; and (3) the hash of data indicating at least one of the time of detecting the entry device, the data indicating a date of detecting the entry device and the data indicating a location of detecting the entry device in the first data block.

The processor can be further programmed to form a network with at least one second computer included in at least one respective second vehicle during a trip. The processor can be further programmed to select at least one of the first data block and the second data block to store on a second computer in the network; and transmit the selected at least one data block to the second computer to be stored during the trip.

The processor can be further programmed to transmit a third data block specifying terms for storing the at least one data block together with the at least one data block.

The network can be an ad-hoc network including a plurality of nodes, each of the plurality of nodes comprising a computer in a respective vehicle; and each of the vehicles is communicatively coupled via wireless vehicle-to-vehicle communication with at least one other vehicle.

The processor can be further programmed to: monitor a vehicle communications bus; detect data indicating a trip event on the vehicle communications bus; and determine that the trip event is detected based on the data indicating a trip event.

The trip event can be an action taken by a user of a first vehicle including the computer.

Further disclosed is a method comprising: generating, upon detecting a vehicle entry device, a first data block including a hash of identification data for the entry device; and generating, upon detecting a trip event, a second data block including a hash of trip event data and a hash linking the second data block to the first data block.

The hash linking the second data block to the first data block can be a hash of data in the first data block.

The method can further comprise including: a hash of a vehicle identification number for a first vehicle in the first data block, wherein the first vehicle includes the computer, and a hash of data indicating at least one of a time of detecting the entry device, data indicating a date of detecting the entry device and data indicating a location of detecting the entry device.

The method can further comprise: including a hash of (1) the hash of the identification data for the entry device; (2) the hash of the vehicle identification number for the first vehicle; and (3) the hash of data indicating at least one of the time of detecting the entry device, the data indicating a date of detecting the entry device and the data indicating a location of detecting the entry device in the first data block.

The method can further comprise: forming a network with at least one second computer included in at least one respective second vehicle during a trip.

The method can further comprise: selecting at least one of the first data block and the second data block to store on a second computer in the network; and transmitting the selected at least one data block to the second computer to be stored during the trip.

The method can further comprise: transmitting a third data block specifying terms for storing the at least one data block together with the at least one data block.

The network can be an ad-hoc network including a plurality of nodes, each of the plurality of nodes comprising a computer in a respective vehicle; and each of the vehicles is communicatively coupled via wireless vehicle-to-vehicle communication with at least one other vehicle.

The method can further comprise: monitoring a vehicle communications bus; detecting data indicating a trip event on the vehicle communications bus; and determining that the trip event is detected based on the data indicating a trip event.

Further disclosed herein is a computing device programmed to execute any of the above method steps.

Yet further disclosed herein is a computer program product, including a computer readable medium storing instructions executable by a computer processor, to execute an of the above method steps.

Exemplary System Elements

Vehicle data can be stored as data blocks in a vehicle blockchain trip register. A vehicle blockchain trip register, as discussed herein, is a database including a blockchain storing one or more trip data chains, each trip data chain being a portion of the blockchain and including data blocks storing trip identification data and trip event data. The trip data chains, and the data blocks within the trip data chains, are linked in chains by hashes.

A blockchain stores data based on the generation of hashes for blocks of data. A hash in the present context is a one-way encryption of data having a fixed number of bits. An example of hash encryption is SHA-256. The hashes provide links to blocks of data by identifying locations of the block of data in storage (digital memory), for example by use of an association table mapping the hashes to the storage locations. Association tables provide a mechanism for associating the hash (which may also be referred to as a hash key) with a physical address in storage either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a vehicle blockchain trip register is discussed below in reference to FIGS. 4-5.

A computer in a vehicle may transmit copies of data blocks for storage by other computers in other vehicles. The computer may further receive copies of data blocks from other vehicles and store the data blocks.

An example system 100 includes a vehicle 105 including a computer 160 programmed to record data from a trip in a vehicle blockchain trip register.

The computer 160 identifies a new trip trigger based on detecting an authorized entry device. Upon detecting the new trip trigger, the computer 160 creates a trip root block. As described in detail below, the trip root block is a data block that stores hashes based on trip data including a vehicle identification number (VIN), an entry device identification number, and trip specific data such as initial vehicle location, start time, etc. The hashes provide links to respective storage locations storing the vehicle identification number (VIN), the entry device identification number, and trip data, time and location data.

The trip root block further includes a trip unique key. The trip unique key is a hash of the hashes for the vehicle identification number (VIN), the entry device identification number, and trip data, time and location data. Each trip root block may further include hashes used as links to a root block for a previous trip, a last event block in a previous trip, a root block for a subsequent trip, an event block for the current trip, etc.

The computer 160 further generates and stores trip event data blocks during the trip based on events identified from vehicle data. Trip events, as used herein, are changes of operating conditions for the vehicle 105, and/or actions of interest taken by a user of the vehicle 105. For example, specified changes of operating conditions for the vehicle 105 may include starting the vehicle, stopping the vehicle, collisions, rapid accelerations, rapid decelerations, transitioning from one road to another, coming into or out of range of a radio station, coming into or out of range of a Wi-Fi hotspot, etc. Actions of interest taken by the user may be any actions taken by the user during a trip for which it is desired to collect data. Non-limiting examples of actions of interest include inputs to vehicle controls (acceleration, braking, changing gears), inputs to climate control systems (adjusting temperature, fan speed, etc.), input to lighting systems (adjusting the color or intensity of interior lighting), input to entertainment systems (changing radio stations, listening to an audio book), inputs to communications systems, etc.

The trip event data blocks store trip event data, and a hash of the trip event data. The hash of the trip event data provides a link to the trip event data. The event blocks may further include one or more hashes linking the trip event data block to a previous data block or a subsequent data block in the vehicle blockchain trip register.

The computer 160 for the vehicle 105 further enters and participates as a node in an ad-hoc network 140 during the trip. The ad-hoc network 140 may be, for example, a peer-to-peer network and includes two more computers 160 included in two or more respective vehicles 105. Each of the computers 160 participating in the ad-hoc network 140 may request that other computers 160 store data blocks for the computer 160 and may further receive data blocks from other computers 160 for storage. The data blocks sent for storage to other computers 160 and/or received from other computers 160 for storage on the computer 160 may be used for anti-entropy. That is, they may be used to restore damaged data blocks or for validation that data blocks are correct. That is, a first computer 160 in a first vehicle 105 may request that a second computer 160 in a second vehicle 105 store one or more data blocks related to a trip for the first vehicle 105 and may further receive and store one or more data blocks from the second computer 160 related to a trip for the second vehicle 105.

The computers 160 participating in the ad-hoc network 140 can change dynamically as vehicles 105 move into and out of communication range to one another. Accordingly, the computers 160 may be exchanging data for storage with different computers 160 in different respective vehicles 105 at different times during a trip.

Following the trip, the computer 160 can upload the vehicle blockchain trip register and/or data blocks stored for other vehicles 105 to a central server, which may be the remote computer 126, e.g., via a data port. The central server can compare data blocks stored in different computers 160 representing a same trip event and identify and correct occurrences of corrupted or altered data.

An example system 100 includes two or more vehicles 105, each of which is a land vehicle such as a car, truck, motorcycle, etc. Each vehicle 105 includes a vehicle computer 110, sensors 112, actuators 114, vehicle components 116, a human-machine interface (HMI) 118, a vehicle communications module 120, a computer 160, a short-term storage 162 and a long-term storage 164. The computers 160 in the two or more vehicles 105 may form, e.g., under conditions described below, an ad-hoc network 140. In an example, the ad-hoc network 140 may be a peer-to-peer network wherein each computer 160 participates as a node. The computers 160 transmit and receive data blocks to/from other computers 160 in the ad-hoc network 140 and may further store the data. A decision to store the data from other computers 160 may be based, in an example, on terms specified in the data blocks.

The vehicles 105 may operate on a road 150. Three vehicles 105 are shown in FIG. 1 for ease of illustration, but, as will become clear, the system 100 can include two or more vehicles 105. Further, the number of vehicles 105 included in the ad-hoc network 140 can vary over time, as vehicles 105 move into and out of range to communicate with each other via short-range communications. Short-range communications herein means wireless vehicle-to-vehicle communications based on a point-to-point communications technology such as dedicated short-range communications (DSRC), cellular vehicle-to-vehicle communications or 5G/LPE. These wireless protocols may be, for example, microwave point-to-point connections or ad-hoc omni-directional transmissions.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network, more than one processor, e.g., included in electronic control units (ECUs) or the like included in a vehicle 105 for monitoring and/or controlling various vehicle components 116, e.g., a powertrain controller, a brake controller, a steering controller, etc. As used herein, the vehicle communications network is defined as one or more mechanisms for wired or wireless communications between systems and sub-systems of the vehicle 105. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

Via the vehicle communications network, the vehicle computer 110 may transmit messages to various systems and subsystems in the vehicle 105 and/or receive messages from the various devices, e.g., sensors 112, an actuator 114, vehicle components 116, a human-machine interface (HMI) 118, etc. Additionally, in cases where the vehicle computer 110 actually comprises a plurality of devices, the vehicle communications network may be used for communications between devices represented as the vehicle computer 110 in this disclosure. Further, as mentioned below, various controllers and/or sensors 112 may provide data to the vehicle computer 110 via the vehicle communication network.

Vehicle sensors 112 may include a variety of devices such as are known to provide data to the vehicle computer 110. For example, the sensors 112 may include Light Detection And Ranging (LIDAR) sensor(s) 112, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 112 fixed to vehicle 105 bumpers may provide data to provide locations of the objects, second vehicles 105, etc., relative to the location of the vehicle 105. The sensors 112 may further alternatively or additionally, for example, include camera sensor(s) 112, e.g. front view, side view, etc., providing images from an area surrounding the vehicle 105.

The sensors 112 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine speed, brake pressure, etc.

The vehicle 105 actuators 114 are implemented via circuits, chips, or other electronic and or mechanical components that can actuate various vehicle subsystems in accordance with appropriate control signals as is known. The actuators 114 may be used to control vehicle components 116, including braking, acceleration, and steering of a vehicle 105.

In the context of the present disclosure, a vehicle component 116 is one or more hardware assemblies adapted to perform a mechanical or electro-mechanical function or operation—such as moving the vehicle 105, slowing or stopping the vehicle 105, steering the vehicle 105, etc. Non-limiting examples of vehicle components 116 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a suspension, an electronic stability control (ESC) module, a wiper control module, lighting, an entertainment system, etc.

The vehicle 105 further includes a human-machine interface (HMI) 118. The human-machine interface (HMI) 118 includes input devices such as knobs, buttons, switches, pedals, levers, touch screens, microphones, etc. that can receive input from a user. For example, the HMI 118 may include a brake pedal, an accelerator pedal, a steering wheel, and a shifter paddle or shifter lever for receiving inputs from a user for controlling the vehicle 105. The input devices may include sensors 112 to detect user inputs and provide user input data to the computer 110 and/or the computer 160. For example, the steering wheel may include sensors 112 to detect an angle of rotation of the steering wheel and provide the data to the computer 110 and/or the computer 160.

The HMI 118 further includes output devices such as displays (including touch screen displays), speakers, lights, etc. that output signals or data to the user.

The HMI 118 is coupled to the vehicle communications network and can send and/or receive messages to/from the computer 110, the computer 160 and other vehicle subsystems. As non-limiting examples, the HMI 118 may, based on user inputs, send messages over the vehicle communications network to control vehicle control systems, climate control systems, entertainment systems, lighting systems, communications systems, etc.

In addition, the vehicle computer 110 may be configured for communicating via a vehicle communications module 120 with devices outside of the vehicle 105, e.g., through a vehicle-to-vehicle (V2V) or vehicle-to-infrastructure (V2X) wireless communications to another vehicle 105 (typically via direct radio frequency communications) and/or (typically via the network 124) a remote computer 126. The vehicle communications module 120 can include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module 120 include cellular, Bluetooth, IEEE 802.11, IEEE 802.11p, IEEE 1609, dedicated short-range communications (DSRC), cellular V2V, 5G/LPE and/or wide area networks (WAN), including the Internet, providing data communication services.

The computer 160 may be a computer such as the computer 110, and includes a processor and a memory such as are known.

The short-term storage 162 may be random access memory (RAM) as is known, or another electronic memory structure on which data can be stored, and later deleted and replaced with alternate data. The long-term storage 164 may be "write once, read many" (WORM) memory which has the property that when data is once written to a data location, the data in that location can be read, but cannot be overwritten.

As described in additional detail below, the computer 160 is programmed to monitor and collect data from the vehicle 105 during a trip and store the data in a vehicle blockchain trip register. The computer 160 is further programmed to form, together with computers 160 in other vehicles 105, an ad-hoc network 140, exchange data with other computers 160 in the ad-hoc network 140, and store data received from other computers 160 in the short-term storage 162 and long-term storage 164.

The network 124 represents one or more mechanisms by which a vehicle computer 110 may communicate with a remote computer 126. Accordingly, the network 124 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 702.11, vehicle-to-vehicle (V2V) such as Dedicated Short-Range Communications (DSRC), 5G/LET, etc.), local area networks (LAN) and/or wide area networks (WAN), including the Internet, providing data communication services.

The remote computer 126 can be a conventional computing device, i.e., including one or more processors and one or more memories, programmed to provide operations such as disclosed herein. Further, the remote computer 126 can be accessed via the network 124, e.g., the Internet or some other wide area network. The remote computer 126 can provide data, such as map data, traffic data, weather data, etc. to the vehicle computer 110.

The ad-hoc network 140 represents one or more mechanisms by which the computers 160 may communicate with each other. As an example, the ad-hoc network may be a peer-to-peer network formed by the computers 160 of respective vehicles 105 travelling (or parked) proximate to each other. The computers 160 of the respective vehicles 105 are communicatively coupled via wireless vehicle-to-vehicle communication with at least one other of the computers. Proximate to each other, as used herein, means each vehicle 105 having a computer 160 participating in the ad-hoc network 140 that is within range for short-range vehicle-to-vehicle wireless communication with at least one other vehicle 105 in the ad-hoc network 140.

The ad-hoc network includes a physical layer, a logical layer and a blockchain layer. The physical layer routes messages between vehicles 105 and is connected to the logical layer. The logical layer, in cooperation with other logical layers in other vehicles 105, superimposes a logical network topology over the physical layer and passes messages from the blockchain layer to the physical layer and from the physical layer to the blockchain layer. The blockchain layer may implement a gossip algorithm for exchanging data blocks with other vehicles 105.

Figure 2:
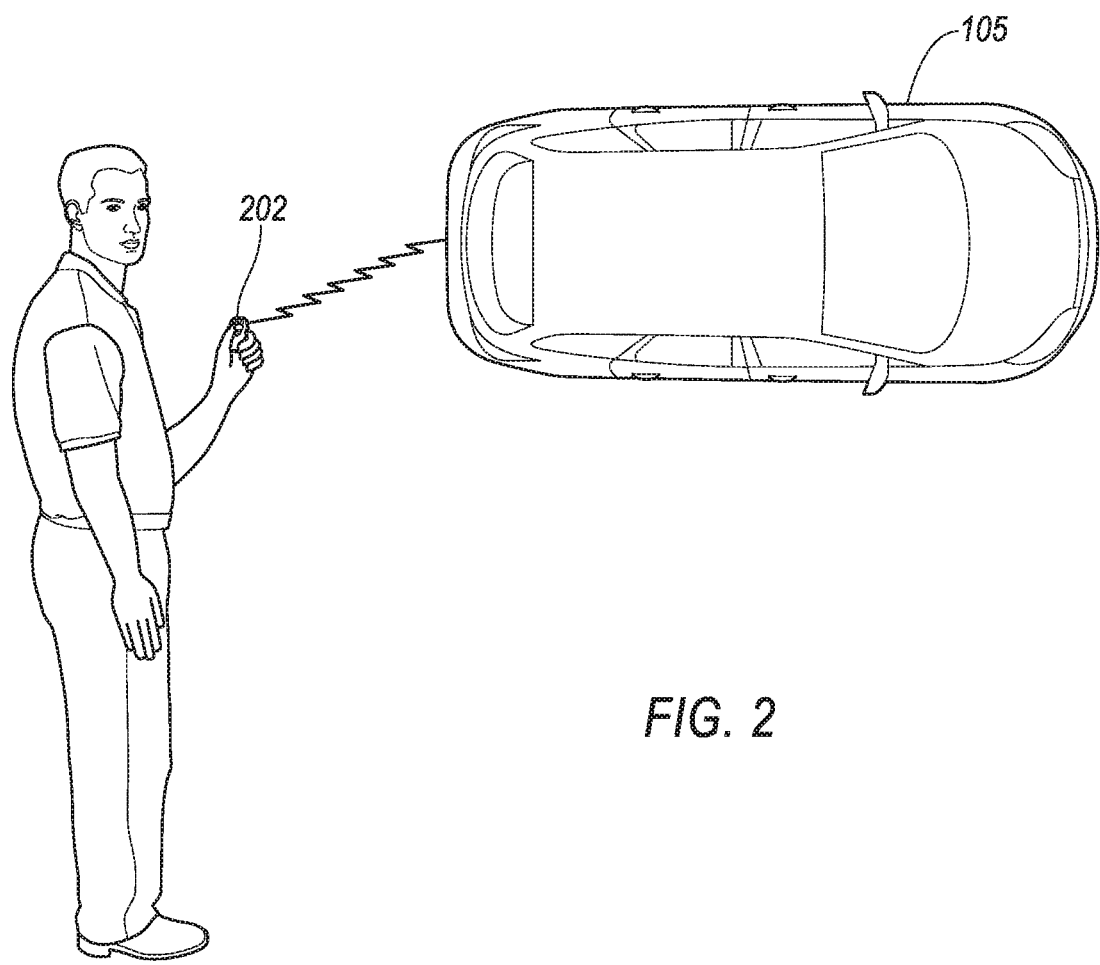
FIG. 2 is a diagram of an example passive entry device in communication with a vehicle.

As shown in FIG. 2, a vehicle 105 may detect an entry device 202 proximate to the vehicle 105. The entry device 202, as used herein, is an electronic device capable of communicating with a computer 110, 160 in the vehicle 105 and/or being detected by the computer 110, 160 in the vehicle 105 via radio frequency communication. As non-limiting examples, the entry device 202 may be a key fob 202 or a passive entry, passive start (PEPS) device 202. Proximate to the vehicle 105, in reference to the entry device 202, means within range for the vehicle 105 to wirelessly communicate with the entry device 202 via specified, i.e., predetermined, radio frequency communications.

In an example, the specified radio frequency communications may require that the vehicle 105 transmit a signal to the entry device 202 via first radio frequency and receive a response from the entry device 202 via a second radio frequency. The first radio frequency may be a low frequency in a range of 30-300 kHz with a typical frequency of 125 kHz. A typical transmission range for the low-frequency communication may be from two to four meters. The second radio frequency may be an ultra-high radio frequency in a range of 300 megahertz (MHz) or greater. Examples of ultra-high radio frequencies used for communications between the entry device 202 and the vehicle 105 include 315 MHz, 433 MHz, 868 MHz, and/or 915 MHz frequency bands. A typical transmission range for the ultra-high frequency communications may be 100 meters. In the example, the computer 160 in the vehicle 105, upon detecting the entry device 202, generates a first hash code and transmits and the first hash code to the entry device 202 via the first radio frequency. The entry device 202 may encrypt the first hash code based on a digital key to generate a challenge code and transmit the encrypted hash code to the computer 160 via the second radio frequency.

The computer 160 may then decrypt the encrypted hash code. In the case that decrypted hash code matches the challenge hash code, the computer 160 determines that the entry device 202 is an authorized entry device 202 and detects a new trip trigger event. The vehicle 105 can be started. The computer 160 further initiates creation of a trip data chain to record events during the trip.

In an example, during the transmission of the encrypted hash code, or via another transmission, the entry device 202 may transmit an entry device 202 identification number to the computer 160. For example, the entry device 202 may encrypt the entry device 202 identification number with the digital key. The computer 160 may receive and decrypt the encrypted entry device 202 identification number and compare the entry device 202 identification number with a list of authorized entry devices 202 and determine that the entry device 202 is an authorized entry device 202.

Upon determining that the entry device 202 is an authorized device 202, the computer 160 is programmed to initiate creation of a trip data chain to record trip data in the vehicle blockchain trip register. As described below, the trip data chain includes a trip root data block and one or more trip event data blocks.

Figure 3:
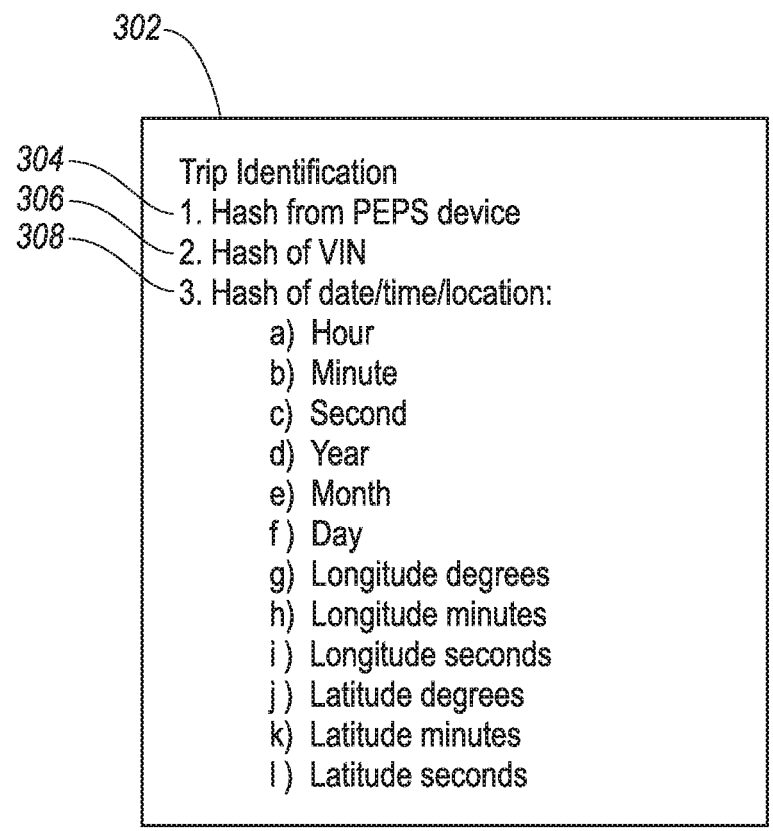
FIG. 3 is a diagram of example trip identification links for linking to trip identification data.

Initially, upon detecting the new trip trigger, the computer 160 stores trip identification data and generates trip identification links 302 to access the trip identification data, as shown in FIG. 3. The trip identification links 302 includes a hash 304 of an entry device 202 identification number, a hash 306 from the vehicle identification number (VIN), and hash 308 from time, date and location data for the vehicle 105. Each hash provides a link to the respective data, and further provides a code for verifying the respective data.

Figure 4:
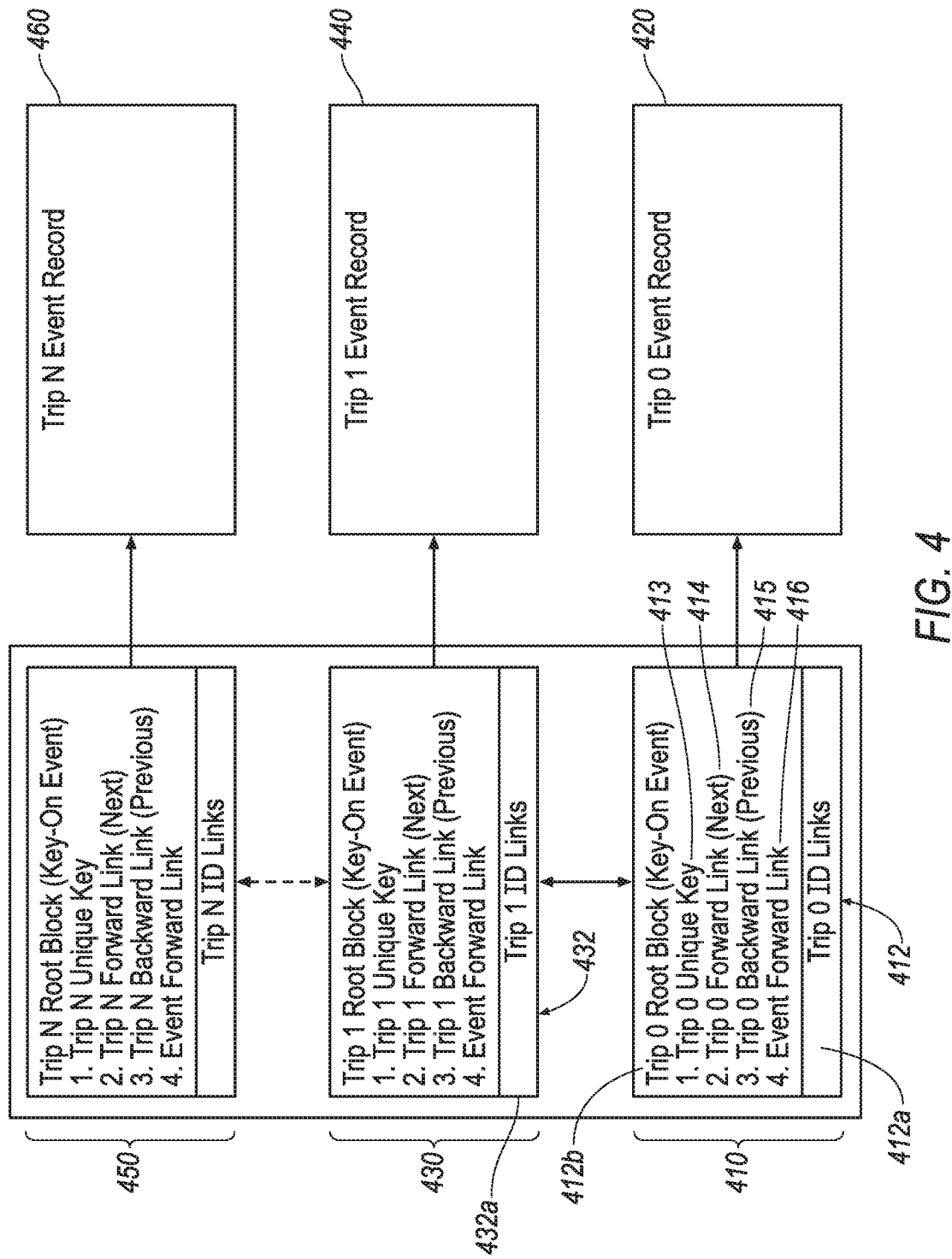
FIG. 4 is a diagram of an example vehicle blockchain trip register.
Figure 5:
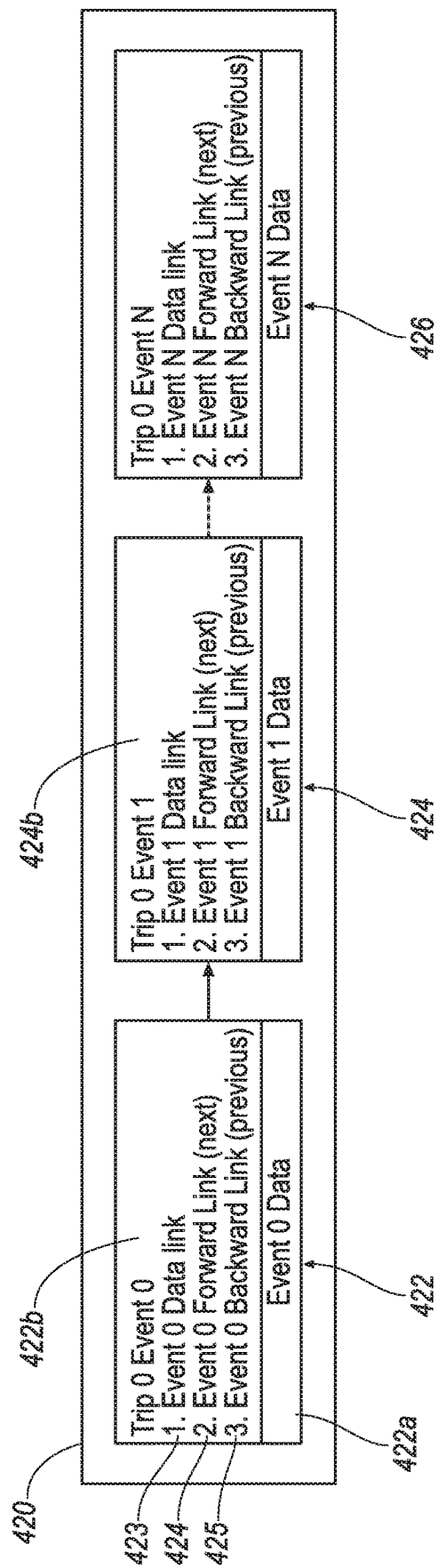
FIG. 5 is diagram of an example trip event record.

FIGS. 4 and 5 illustrate a portion of a vehicle blockchain trip register 400 for the vehicle 105. The vehicle blockchain trip register 400 includes a trip 0 data chain 410, a trip 1 data chain 430 and a trip N data chain 450.

Each trip data chain 410, 430, 450 includes a trip root block 412, 432, 452 and a respective trip event record 420, 440, 460.

The trip root block for each trip data chain is a data block including a data component and a blockchain linking component. The data component includes data links to trip identifying data as described in reference to FIG. 3. The blockchain linking component includes a link to the data component, a trip forward link to a root trip block for a previous trip, a trip backward link to a root block for a previous trip, and an event link to event 0 of the trip.

As an example, the trip 0 root block 412 includes a data component 412a and a blockchain linking component 412b.

The data component 412a includes the links to trip identifying data. As described above in reference to FIG. 3, the trip identifying data may be an identification number of the entry device 202 used to initiate the trip, the vehicle identification number (VIN) of the vehicle 105, and date/time/location data of the vehicle 105 at a beginning of the trip. The links to each of the trip identifying datum may be respectively a hash of the identification number of the entry device 202, a hash of the vehicle identification number (VIN) of the vehicle 105, and a hash of the time/date/location data.

The blockchain linking component 412b includes the link to the data component 413, the trip forward link to a root trip block for a previous trip 414, the trip backward link to a root block for a previous trip 415, and an event link to event 0 of the trip 416. The trip to the data component 413 is also referred to herein as the trip unique key 413.

Each link in the blockchain linking component 412b may be a hash of the data to which it provides a link. For example, the trip unique key 413 may be a hash of the hash of the identification number of the entry device 202, the hash of the vehicle identification number (VIN) of the vehicle 105, and the hash of the time/date/location data.

The trip forward link 414 may be a hash of the data component 432a of the root block 432 of the next trip in the vehicle blockchain trip registry 400. The hash of the data component 432a of the root block 432 of the next key may also be referred to as the unique key of next trip. This data is not available at the time of initial creation of the root block 412 and can be back filled by the computer 160 at a time of creating the root block 432.

The trip backward link 415 may be a hash of the linking component of a previous root block. The root block 412 is an initial root block in the vehicle blockchain trip registry, and therefore, the trip backward link 415 may be null (i.e., no data).

The event forward link 416 is a link to the trip 0 event 0 data block 422 (FIG. 5). The event forward link 416 may be a hash of the linking component 422b of the trip 0 event 0 data block 422. This data is not available at the time of initial creation of the root block 412 and can be back filled by the computer 160 at a time of creating the trip 0 event 0 event block 422.

Each trip data chain includes one or more event data blocks. Each event data block records an event during the trip. Each event data block includes a linking component and an event data component.

The event data component stores data relating to an event. For example, the event may be that the user changed stations on the radio from a first station to a second station. The event data may include an identity of the first radio station, an identity of the second radio station, a time of changing radio stations, and a location of the vehicle when changing radio stations.

The linking component may include an event data link, an event forward link to a next event data block and an event backward link to a previous event data block or a root block. Each link may be a hash of the data to which it provides a link. For example, the trip event data link may be a hash of the data stored in the respective trip event data component. The forward link may be a hash of the linking component of the next event link in the trip event record. The back link may be a hash of the linking component in the previous event data block or root data block.

FIG. 5 illustrates a portion of a trip 0 event record 420 for the trip 0 data chain 410.

The trip 0 event record 420 includes a trip 0 event 0 data block 422, a trip 0 event 1 data block 424 and a trip 0 event N data block 426.

The trip 0 event 0 data block 422 includes a trip 0 event 0 data component 422a and a trip 0 event 0 linking component 422b. The trip 0 even 0 data component 422a includes data describing the event.

The trip 0 event 0 linking component 422b may include an event 0 data link 423, an event 0 forward link 424 to the next event data block 424 and an event 0 back link to a previous block, in this case the root block 412.

The event 0 data link 423 may be a hash of the trip event data stored in the trip event data component 422a.

The event 0 forward link 424 may be hash of the linking component 424b of the event data block 424 typically does not exist at a time of creating the trip 0 event 0 data block. Accordingly, the event 0 forward link 424 may be back filled into the trip 0 event 0 linking component 422b at a time of recording trip 0 event 1.

The event 0 backward link 425 may be a hash of the linking component of a previous data block. In the case of the trip 0 event 0 data block 422, the event backward link 425 may be a hash of the linking component 412b of the root block 412.

Figure 6:
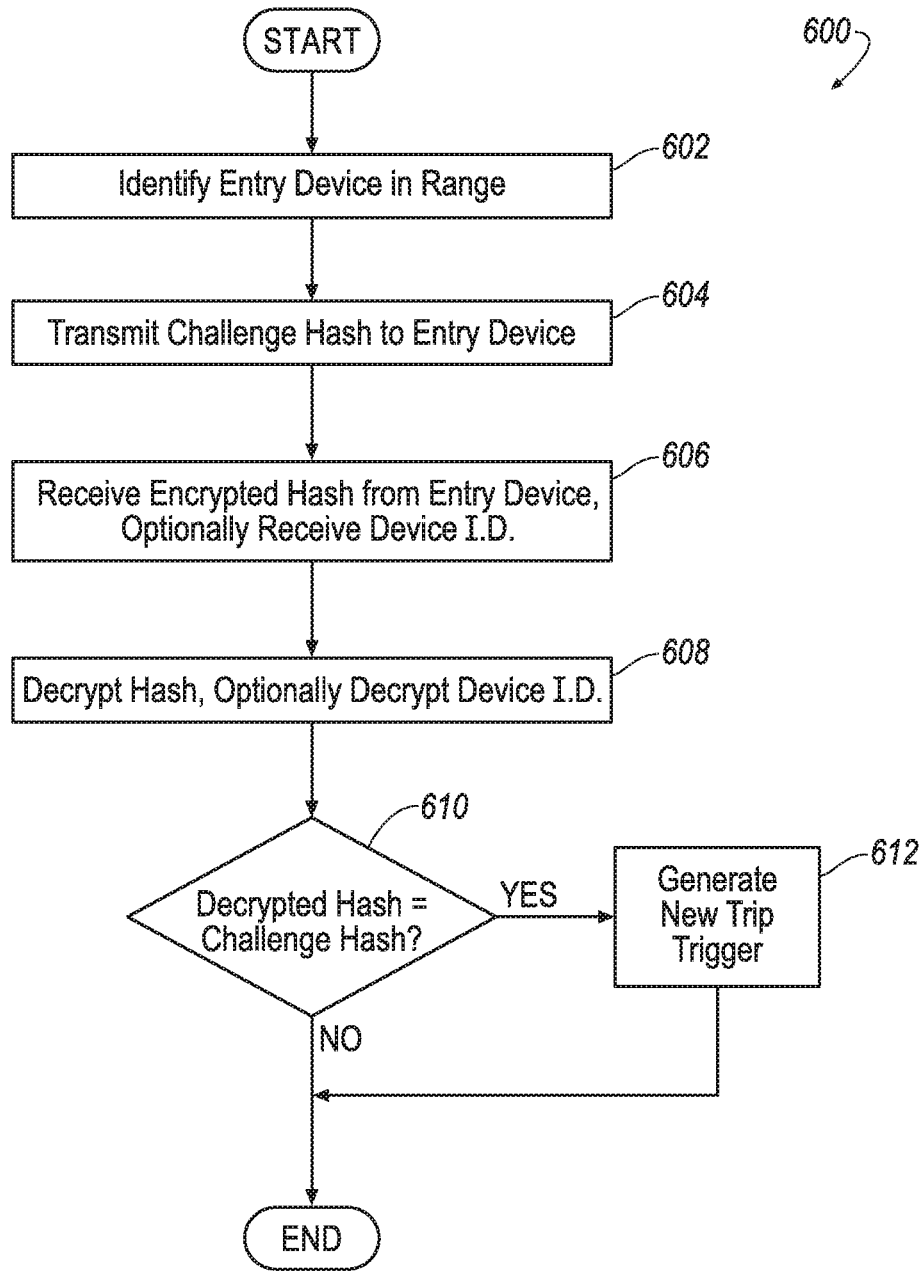
FIG. 6 is a flowchart of an example process for detecting a new trip trigger event.

FIG. 6 illustrates an example process 600 for detecting a new trip trigger event. The process 600 starts in a block 602.

In the block 602, the computer 160 in the vehicle 105, identifies an entry device 202 within range of the vehicle 105. As a first example, the entry device 202 may be a passive entry, passive start (PEPS) device 202. In one case, the computer 160 may detect a trigger. For example, the computer 160 may detect that a user of the vehicle 105 has touched or pulled a door hand. In another case, the computer 160 may recognize a periodic signal, for example, a signal that is received once per minute, as a trigger. In another case, the computer 160 may detect that the user has pushed a start button a dashboard in the vehicle 105. The examples identified above are not limiting. Other types of triggers or trigger events may be detected/recognized by the computer 160. Based on the trigger, the computer 160 may transmit, as an example, a radio frequency signal in a low-frequency band (e.g., 30-300 kHz). Based on the radio frequency signal, the PEPS device 202 may produce a current. The current wakes-up the PEPS device 202, which may respond in an ultra-high frequency band. The ultra-high frequency band may include, for example, 315 MHz, 433 MHz, 868 MHz, and/or 915 MHz frequency bands.

As a second example, the entry device may be a key fob 202. The key fob 202 may transmit a message to the computer 160 via radio frequency communication in the high frequency band and the computer 160 may detect the message. Upon detecting the entry device 202, the process 600 continues in a block 604.

In the block 604, in response to detecting the entry device 202, the computer 160 may generate a challenge hash based on a random number. The computer 160 may then transmit the challenge hash to the entry device 202. The process 600 continues in a block 606.

In the block 606, the entry device 202 receives the hash from the computer 160 and responds to the computer 160. The entry device 202 may, for example, encrypt the challenge hash received from the computer 160 based on a first digital key. The entry device 202 may further encrypt an identification number for the entry device 202. The entry device 202 may transmit the encrypted challenge hash and when applicable, the encrypted entry device identification number to the computer 160. The process 600 continues in a block 608.

In the block 608, the computer 160 receives and decrypts the encrypted challenge hash and when applicable, the decrypted identification number of the entry device 202 based on a second digital key. In a case that the entry device 202 is an authorized entry device 202 for the vehicle 105, the first digital key and second digital key may correspond such that data encrypted by the first digital key can be decrypted and recovered with the second digital key. The computer 160 may further decrypt the encrypted identification number for the entry device 202 The process 600 continues in a block 610.

In the block 610, the computer 160 compares the decrypted hash to the challenge hash. In the case that the decrypted hash matches the challenge hash, the computer 160 determines that the entry device 202 is an authorized entry device 202. Alternatively or additionally, the computer 160 may compare the decrypted identification number for the entry device 202 with a list of authorized entry devices 202, and, upon identifying a match, determine that the entry device 202 is an authorized device. In the case that the computer 160 determines that the entry device 202 is an authorized device, the process 600 continues in a block 612. Otherwise, the process 600 ends.

In the block 612, the computer 160 determines that a new trip trigger has been detected. The computer 160 may set a digital marker (flag) indicating that the new trip trigger has been detected and/or initiate the process 700 for generating a new trip data chain. The process 600 then ends.

Figure 7A:
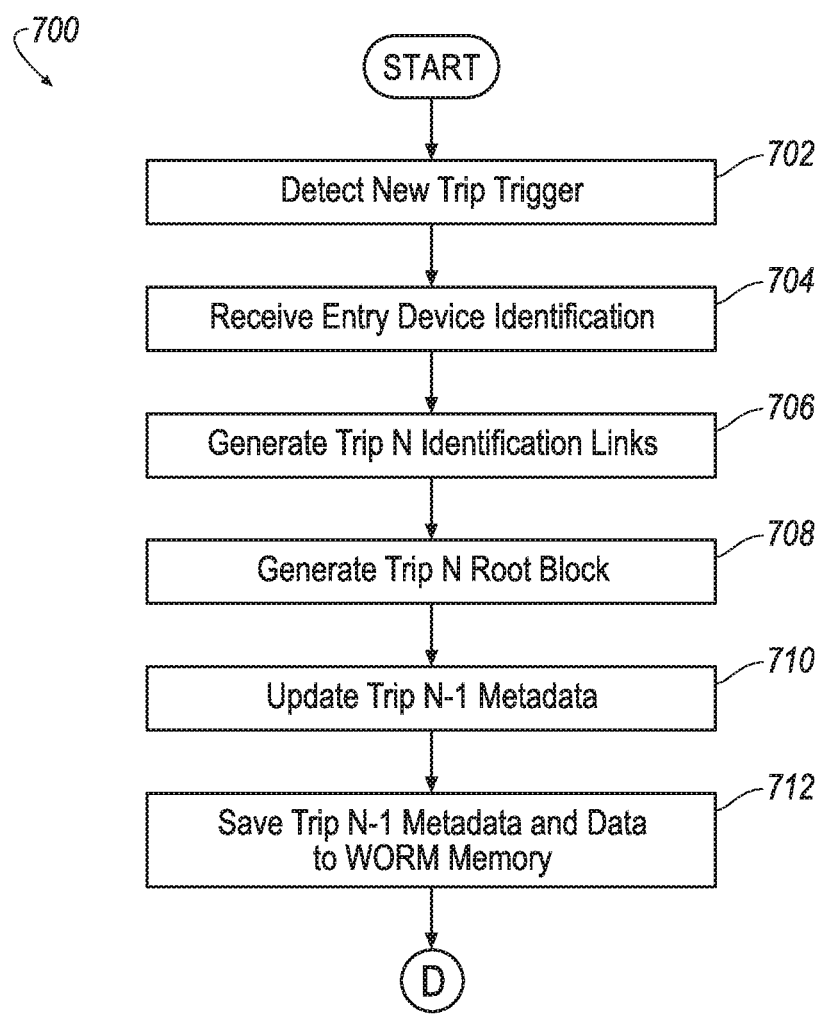
FIGS. 7A and 7B are a flowchart of an example process for generating a trip data chain.
Figure 7B:
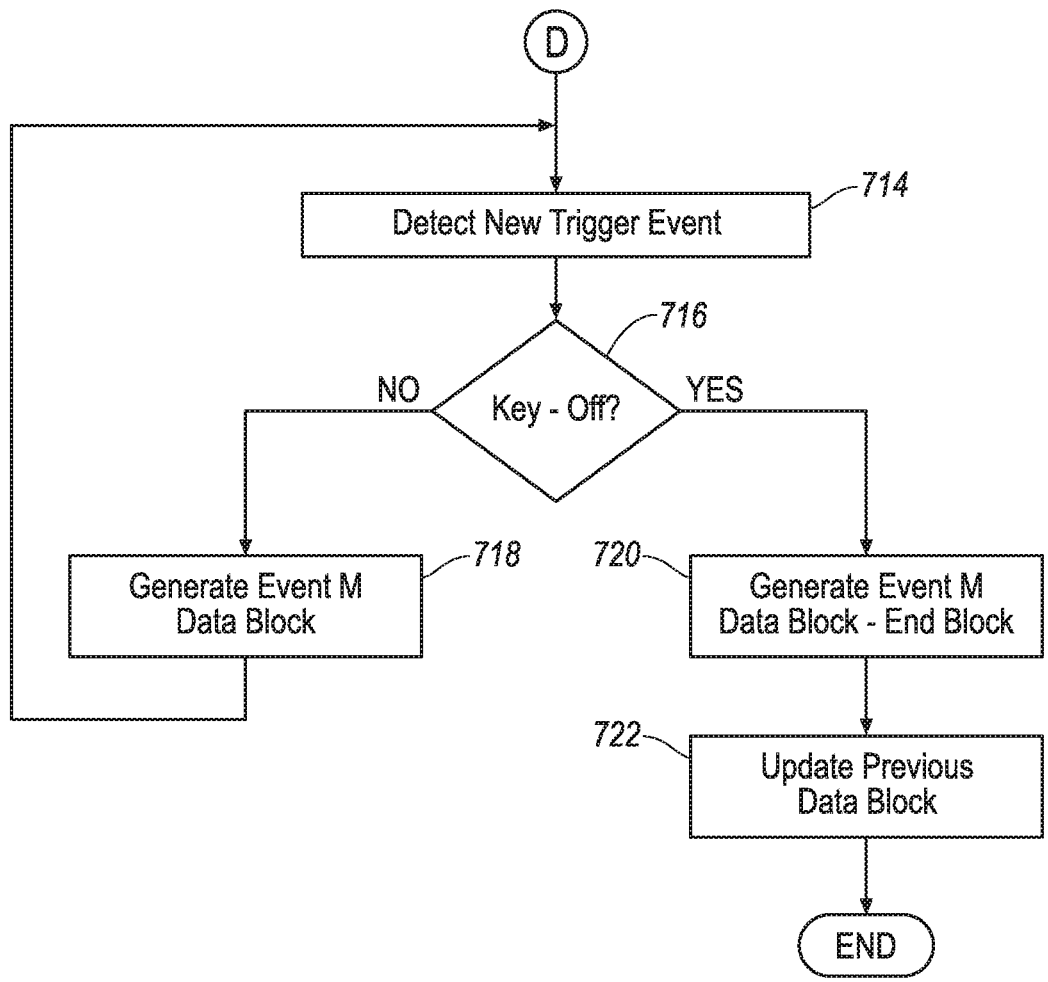

FIGS. 7A and 7B are a block diagram of an example process 700 for generating and entering a new trip data chain into the vehicle block trip register. The process 700 starts in a block 702.

In the block 702, the computer 160 detects a new trip trigger. For example, the computer 160 could periodically (e.g., at regular time intervals, such as once every second) query a memory location to determine whether a flag has been set by the process 600 for a new trip. Alternatively, the process 600, upon detecting and authenticating the entry device 202 could initiate the process 700. The process continues in a block 704.

In the block 704, the computer 160 receives an identification number for the entry device 202. For example, the computer 160 may have, during the process 600, stored the identification number for the entry device 202 in memory, and the computer 160 may retrieve the identification number from memory. Alternatively, the computer 160 may transmit a request for the entry device identification number to the entry device 202, and subsequently receive the entry device identification number from the entry device 202. The process 700 continues in a block 706.

In the block 706, the computer 160 generates trip N identification data and trip N linking data. N is an integer 0 or greater. Trip N is a current and Nth trip for which data is being stored in the vehicle blockchain trip register.

As described above, trip N identification data is data uniquely identifying the Nth trip. The trip N identification data may include an identification number of the entry device 202 used to initiate the trip, the vehicle identification number (VIN) of the vehicle 105, and date/time/location data of the vehicle 105 at a beginning of the trip. The computer 160 may store the trip N identification data in short-term storage 162 and/or long-term storage 164.

The trip N linking data includes links to the trip N identification data. The trip N linking data includes a hash of the identification number of the entry device 202, a hash of the vehicle identification number (VIN) for the vehicle 105, and a hash of date/time/location data for the vehicle 105 at a beginning of the Nth trip. The computer 160 may, for example, generate the hash of the identification number of the entry device 202, the hash of the vehicle identification number (VIN), and the hash of date, time and location data for the vehicle 105 at the beginning of the Nth trip, and store the three hashes together as a datum in the short-term storage 162. The process 700 continues in a block 708.

In the block 708, the computer 160 generates a trip N root block for the trip N data chain. As described above, the trip N root block includes a trip N data component and a trip N linking component.

To generate the trip N root block, the computer 160 may designate a memory location for the trip N data component and the trip N linking component. Initially, the designated memory location may be a location in short-term storage 162. The computer 160 may then store the trip N data component, i.e., the hash of the vehicle identification number (VIN), and the hash of date, time and location data for the vehicle 105 at the beginning of the Nth trip, in the memory location designated for the trip N data component.

The computer 160 then generates the trip N linking component. The trip N linking component may include (1) the trip N unique key, (2) a trip N forward link to a data component of a next trip root block, (3) a trip N backward link to a previous trip root block and (4) an event link to event 0 of trip N.

The computer 160 may generate the trip N unique key by generating a hash from the trip N identification links. and storing it in a short-term storage memory location.

At a time of generating the trip N root block, the data for the trip N forward link is not yet available. Accordingly, the computer 160 may reserve a memory location for the trip N forward link, and fill it with placeholder data (for example, a known null code).

To generate the trip N backward link, the computer 160 may generate a hash from a linking component of a root block of a most recent previous trip. In a case that the trip N is a first trip in the vehicle blockchain trip registry, the computer 160 may insert a null in a memory location for the trip N backward link.

The computer 160 may further reserve a memory location for an event forward link. Data is not available to determine the event forward link at a time of generating the trip N root block. Accordingly, the computer 160 can insert the designated memory location with placeholder or null data. The process continues in a block 710.

In the block 710, the computer 160 updates the trip N−1 root block. The computer 160 calculates a hash from the trip N data component, and inserts it to a memory location reserved for the trip forward link in the trip N root block. Upon updating the trip N−1 root block, the trip N−1 root block should be complete. The process 700 continues in a block 712.

In the block 712, the computer 160 may transfers the trip N−1 root block from short-term storage 162 to long-term storage 164. The process 700 continues in a block 714.

In the block 714, the computer 160 detects a new event trigger. The new event trigger may be data, for example data on a CAN bus, indicating that a trip event has occurred. Upon detecting data on the CAN bus indicating the trip event, the process 700 continues in a block 716.

In the block 716, the computer 160 determines whether the trip event was a key-off. In the case that the trip event was a key-off, the process 700 continues in a block 718. Otherwise, the computer 160 continues in a block 724.

In the block 718, the computer 160 generates a trip N, event M data block. M is an integer zero or greater used as an index for event data blocks included in the trip N data chain. As described above, the event M data block includes a trip N event M data component, and a trip N event M linking component.

The trip N event M data component includes data related to and describing trip N event M. For example, the data may be data indicating that the user has taken an action of interest. The computer 160 may generate data identifying the action of interest, and information indicating a time of the trip event, and a location of the trip event. In some cases, the computer 160 may further generate data indicating an operating condition of the vehicle 105, such as a cabin temperature, an engine temperature, a speed of the vehicle 105, etc., at the time of the trip event. The computer 160 may store the trip event data in a location for the trip N event M data component.

Upon generating and storing the trip event data, the computer 160 generates the trip N event M linking component. The trip N event M linking component may include (1) a trip N event M data link, (2) a trip N event M forward link to a next event data block, and (3) a trip N event M backward link to either the trip N root block for M=0 or to previous event data block for M>0.

The computer 160 computes a hash of the data in the trip N event M data component to generate the trip N event M data link and stores the trip N event M data link in a designated memory location.

The computer 160 cannot yet generate the trip N event M forward link, because the trip N event M+1 event has not yet occurred. The computer 160 may store a null code or place holder code in a memory location designated for the trip N event M+1 data block.

The computer 160 further generates and stores a trip N event M backward link to the previous data block. For M=0, the computer 160 computes a hash of the trip N root block linking component and stores the hash in a memory location designated for trip N event M backward link.

For M>0, the computer 160 computes a hash for the trip N event M−1 linking component and stores it in the memory location designated for the trip N event M backward link. The process 700 continues in the block 714.

A block 720 follows the block 716 in the case that the trip event is a key-off. In block 724, the computer 160 generates the trip N event M data block for a key-off event.

Initially, in the block 720, the computer 160 generates data for the data component of the trip N event M data block. The data for the data component may be, for example, that a key-off event has occurred, a time of the key-off event and a location of the key-off event. The computer 160 stores the data in a memory location designated for the data component.

Upon generating and storing the trip event data, the computer 160 generates the trip N event M linking component. The trip N event M linking component may include (1) a trip N event M data link, (2) a trip N event M forward link to a next event data block, and (3) a trip N event M backward link to either the trip N root block for M=0 or to previous event data block for M>0.

The computer 160 computes a hash of the data in the trip N event M data component to generate the trip N event M data link and stores the trip N event M data link in a designated memory location.

In the case that the trip event was a key-off, the event data block is the last data block in a trip event record. Accordingly, the forward link to a next data block will be null. The computer 160 may store a null code in a memory location designated for the trip N event M forward link.

The computer 160 further generates and stores a trip N event M backward link to the previous data block. For M=0, the computer 160 computes a hash of the trip N root block linking component and stores the hash in a memory location designated for trip N event M backward link.

For M>0, the computer 160 computes a hash for the trip N event M−1 linking component and stores it in the memory location designated for the trip N event M backward link. The process 700 continues in a block 722.

In the block 722, the computer may update a previous data block. In a case that M=0, the computer 160 computes a hash of the trip N event M linking component and stores it in the event forward link location of the trip N root block. In a case that M>0, the computer 160 computes the hash for the trip N event M linking component and stores it in the trip N event M−1 event forward link location.

The computer 160 can then complete the rest of the trip N data chain, working backward through the Trip N event data blocks to the Trip N root block. Completing the trip N event M−1 event block makes it possible to generate the forward link for the trip N event M−2 event block. Completing the trip N event M−2 event block makes it possible to generate the forward link for the trip N event M−3 event block, etc., back to the trip N root block. The process 700 then ends.

The computer 160 in the vehicle 105 may, from time-to-time, or continuously, during a trip, enter into an ad-hoc network 140 with other computers 160 in other vehicles 105. During participation in the ad-hoc network 140, the computer 160 can transmit data blocks to other computers in the other vehicles 160 for storage in the short-term storage 162 or long-term storage 164 in the respective other vehicles 105. Further, the computer 160 can receive data blocks from other computers 160 for storage in the vehicle 105 in the short-term storage 162 or long-term storage 164.

Figure 8:
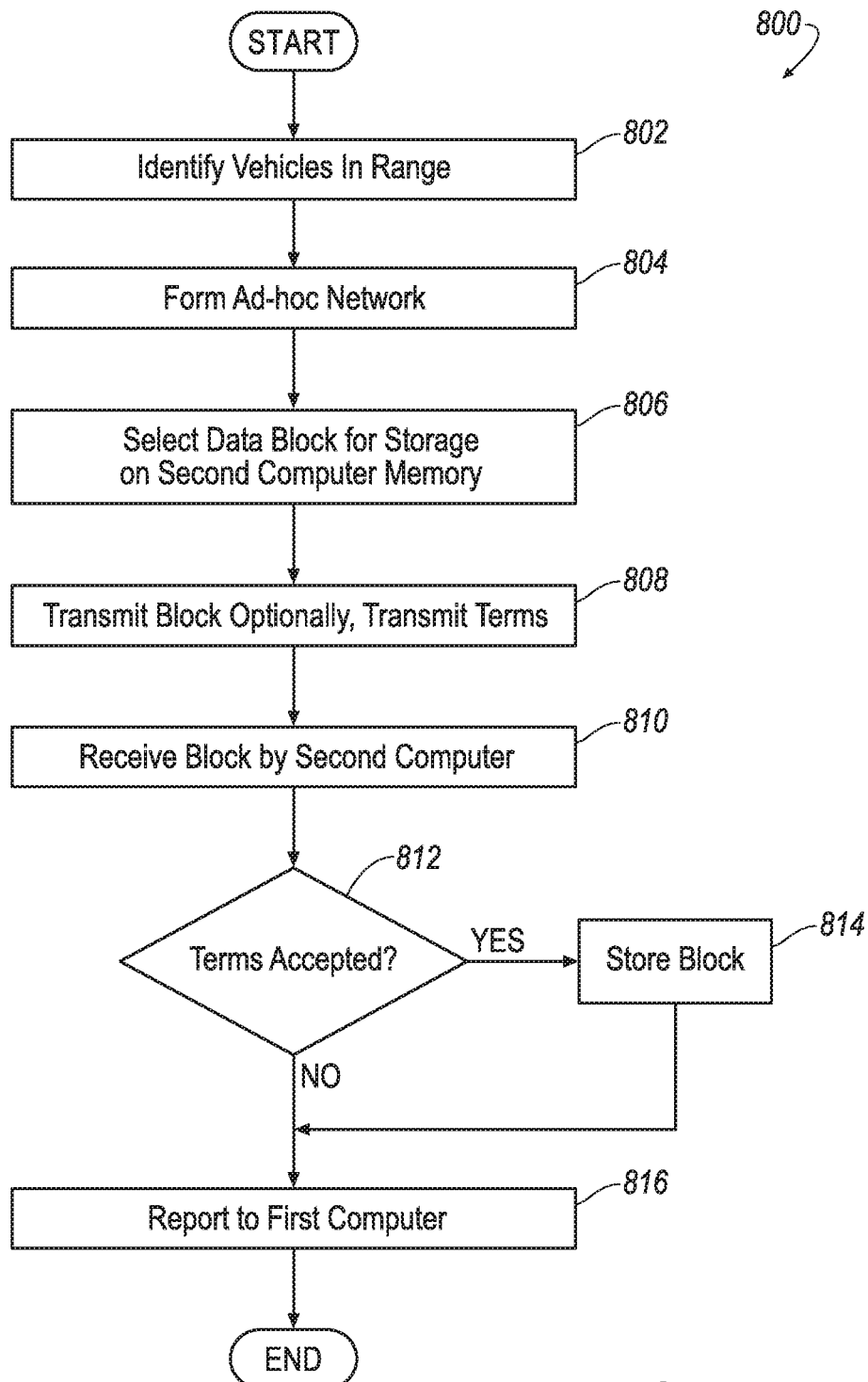
FIG. 8 is a flowchart of an example process for saving a data block from a first vehicle to storage in a second vehicle.

FIG. 8 illustrates an example process 800 for forming an ad-hoc network and storing vehicle data from a first vehicle to storage on a second vehicle. The process 800 starts in a block 802.

In the block 802, a first computer 160 on a first vehicle identifies one or more second vehicles 105, including respective second computers 160, in range for short-range communications with the first computer 160. In range for short-range communications herein means that each vehicle 105 is within range for short-range communications with at least one other vehicle 105 such that all the vehicles 105 can be linked together in an ad-hoc network 140. The process 800 continues in a block 804.

In the block 804, the first computer 160 forms the ad-hoc network 140 with the one or more second computers 160. The ad-hoc network 140 may be, for example, a peer-to-peer network. The process 800 continues in a block 806.

In the block 806, the first computer 160 selects a first data block to store on a second computer 160. For example, the first computer 160 may be programmed to protect data blocks related to user actions related to "infotainment" system usage and select, to be the first data block, a data block indicating that the user started to listen to an audio book.

As another example, the first computer 160 may be triggered to select a trip n–1 data chain to store on the second computer 160 when the trip N–1 data chain is complete and transferred to long-term storage 164. For example, the trip N–1 data chain may be complete when a forward link for the trip N root block (the next trip) is inserted in the trip N–1 root block as described in reference to block 710. Upon completing the trip n–1 root block, the computer 160 may then transfer the trip N–1 data chain to long-term storage as described in reference to block 712. Upon transferring the trip N–1 data chain to the long-term storage 164, the computer 160 may further select the trip N–1 data chain to store on the second computer 160. The process 800 continues in a block 808.

In the block 808, the first computer 160 transmits the first data block to one or more second computers 160 together with a request to store the first data block. For example, the first computer 160 may transmit the first data block to all, or a selected subset of second computers 160 in the ad-hoc network 140 and request that each of them store the first data block.

Additionally, the first computer 160 may transmit a second data block specifying terms for data block storage. A data block specifying terms for data block storage may be known as a smart contract. The second data block may indicate, for example, that an account associated with the first computer 160 will transfer funds to an account associated with a second computer upon successfully storing the first data block. The second data block may further specify that the second computer is required to return a copy of the first data block upon request. As another example, the second data block may specify that the second computer 160 enter into a reciprocal relationship with the first computer 160. The reciprocal relationship may specify, for example, that each computer 160 will store a specified number of data blocks for the other computer 160, and that each computer 160 will receive a fee of a specified amount for each data block stored. These examples are not intended to be limiting, and other terms be used may be used to specify duties of each of the first computer 160 and the second computer 160 with respect to the other. The process 800 continues in a block 810.

In the block 810, a second computer 160 receives the first data block and when applicable the second data block specifying terms for storage. The second computer 160 may store the first data block and second data block in short-term storage 162 pending a decision to store the first data block in long-term storage 164. The process 800 continues in a block 812.

In the block 812, in a case that the second computer 160 received a second data block specifying terms together with the first data block, and/or in the case of default terms for storage, the second computer 160 may determine whether the second computer 160 accepts the terms. For example, the second computer 160 may require a fee above a pre-determined threshold to store the first data block. In a case that the terms propose a fee above the pre-determined threshold, the second computer determines to accept the terms.

In a case that the second computer 160 accepts the terms, the process 800 continues in a block 814. Otherwise, the process continues in a block 816.

In the block 814, the second computer 160 stores the first data block in long-term storage 164. The process continues in the block 816.

In the block 816, the second computer 160 sends a report to the first computer 160 indicating whether the second computer 160 stored the first data block in long-term storage 164. In the case that the second computer 160 had received a second data block with terms, the second computer 160 may electronically sign the second data block and return it to the first computer 160 as confirmation of the agreement. The first computer 160 may receive the signed agreement, and, for example, store it in long-term storage 164. The process 800 then ends.

The first computer 160 may, from time-to-time, check the vehicle blockchain trip register for errors in a data block. The encrypted link to the data component for each data block is a hash of the data. The first computer 160 can determine whether data in the data component of the data block is correct (i.e., unchanged) by accessing the data via the encrypted link (hash) to the data component, recomputing the hash for the data in the data component, and comparing the recomputed hash with the encrypted link. In a case that the recomputed hash matches the encrypted link, the data is unchanged. In a case that the recomputed hash does not match the encrypted link, either the data in the data component, or the encrypted link has changed, for example due to corruption or tampering.

The first computer 160 may access the data blocks in the vehicle blockchain trip register by following the encrypted links, for example the encrypted links from trip data chain to trip data chain included in the trip root blocks, and from block-to-block within a trip data chain by following the encrypted links from block-to-block within the trip root block and event data blocks.

The first computer 160 can, upon detecting an error in a data block, retrieve copies of the data block saved on one or more second computers 160 in the ad-hoc network 140. The first computer 160 may transmit, on the ad-hoc network 140 an encrypted link to the copies of the data block. Based on the encrypted link, the second computers 160 may retrieve the copy of the data block stored in the respective short-term storages 162 or long-term storages 164 associated with the second computers 160 and transmit the copies of the data block to first computer 160.

The first computer 160 can compare the respective data components with the data component of the damaged data block, and further compare respective linking components with the linking component in the damaged data block. Based on the comparisons, the computer 160 can determine whether the data component of the data block is damaged (i.e., does not match the copies) or linking component of the data block is damaged (i.e., does not match the copies). In a case of ambiguity, i.e., that some copies match and some copies do not match for either or both of the data component and the linking component, the computer 160 can apply a majority algorithm, and recognize as correct, data in the data component or links in the linking component consistent with a majority of the copies (including the original version from the first computer 160).

Upon identifying the damaged data or linking component, the computer 160 can replace the damaged data or linking component with a version consistent with a majority of the copies, under the restriction that, following replacement, a hash of the data component must match the encrypted link to the data component.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. CD-ROM and DVD are examples of write once/read many (WORM) devices.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer comprising a processor and a memory, the memory including instructions such that the processor is programmed to:
   generate, upon detecting a vehicle entry device, a first data block including a hash of identification data for the entry device; and
   generate, upon detecting a trip event, a second data block including a hash of trip event data and a hash linking the second data block to the first data block.

2. The computer of claim 1, wherein the hash linking the second data block to the first data block is a hash of data in the first data block.

3. The computer of claim 1, wherein the processor is further programmed to:
   include a hash of a vehicle identification number for a first vehicle in the first data block, wherein the first vehicle includes the computer.

4. The computer of claim 3, wherein the processor is further programmed to:
   include a hash of data indicating at least one of a time of detecting the entry device, data indicating a date of detecting the entry device and data indicating a location of detecting the entry device.

5. The computer of claim 4, wherein the processor is further programmed to:
   include a hash of (1) the hash of identification data for the entry device; (2) the hash of the vehicle identification number for the first vehicle; and (3) the hash of data indicating at least one of the time of detecting the entry device, the data indicating a date of detecting the entry device and the data indicating a location of detecting the entry device in the first data block.

6. The computer of claim 1, wherein the processor is further programmed to:
   form a network with at least one second computer included in at least one respective second vehicle during a trip.

7. The computer of claim 6, wherein the processor is further programmed to:
   select at least one of the first data block and the second data block to store on a second computer in the network; and
   transmit the selected at least one data block to the second computer to be stored during the trip.

8. The computer of claim 7, wherein the processor is further programmed to:
   transmit a third data block specifying terms for storing the at least one data block together with the at least one data block.

9. The computer of claim 6, wherein:
   the network is an ad-hoc network including a plurality of nodes, each of the plurality of nodes comprising a computer in a respective vehicle; and
   each of the vehicles is communicatively coupled via wireless vehicle-to-vehicle communication with at least one other vehicle.

10. The computer of claim 1, wherein the processor is further programmed to:
    monitor a vehicle communications bus;
    detect data indicating a trip event on the vehicle communications bus; and
    determine that the trip event is detected based on the data indicating a trip event.

11. The computer of claim 1, wherein the trip event is an action taken by a user of a first vehicle including the computer.

12. A method comprising:
    generating, upon detecting a vehicle entry device, a first data block including a hash of identification data for the entry device; and
    generating, upon detecting a trip event, a second data block including a hash of trip event data and a hash linking the second data block to the first data block.

13. The method of claim 12, wherein the hash linking the second data block to the first data block is a hash of data in the first data block.

14. The method of claim 12, further comprising:
    including:
    a hash of a vehicle identification number for a first vehicle in the first data block, wherein the first vehicle includes the computer; and
    a hash of data indicating at least one of a time of detecting the entry device, data indicating a date of detecting the entry device and data indicating a location of detecting the entry device.

15. The method of claim 14, further comprising:
    including a hash of (1) the hash of the identification data for the entry device; (2) the hash of the vehicle identification number for the first vehicle; and (3) the hash of data indicating at least one of the time of detecting the entry device, the data indicating a date of detecting the entry device and the data indicating a location of detecting the entry device in the first data block.

16. The method of claim 12, further comprising:
    forming a network with at least one second computer included in at least one respective second vehicle during a trip.

17. The method of claim 16, further comprising:
    selecting at least one of the first data block and the second data block to store on a second computer in the network; and
    transmitting the selected at least one data block to the second computer to be stored during the trip.

18. The method of claim 17, further comprising:
    transmitting a third data block specifying terms for storing the at least one data block together with the at least one data block.

19. The method of claim 16, wherein:
    the network is an ad-hoc network including a plurality of nodes, each of the plurality of nodes comprising a computer in a respective vehicle; and each of the vehicles is communicatively coupled via wireless vehicle-to-vehicle communication with at least one other vehicle.

20. The method of claim 12, further comprising:
monitoring a vehicle communications bus;
detecting data indicating a trip event on the vehicle communications bus; and
determining that the trip event is detected based on the data indicating a trip event.

* * * * *